US012652362B2

(12) United States Patent
Lindmeier et al.

(10) Patent No.: US 12,652,362 B2
(45) Date of Patent: Jun. 9, 2026

(54) COMBINING VIDEO STREAMS HAVING DIFFERENT INFORMATION-BEARING LEVELS

(71) Applicant: Apple Inc., Cupertino, CA (US)

(72) Inventors: William D. Lindmeier, San Francisco, CA (US); Devin William Chalmers, Oakland, CA (US)

(73) Assignee: Apple Inc., Cupertino, CA (US)

( * ) Notice: Subject to any disclaimer, the term of this patent is extended or adjusted under 35 U.S.C. 154(b) by 190 days.

(21) Appl. No.: 18/510,181

(22) Filed: Nov. 15, 2023

(65) Prior Publication Data

US 2024/0080408 A1     Mar. 7, 2024

Related U.S. Application Data

(63) Continuation of application No. 17/686,290, filed on Mar. 3, 2022, now Pat. No. 11,856,313, which is a continuation of application No. 16/985,095, filed on Aug. 4, 2020, now Pat. No. 11,375,138.

(60) Provisional application No. 62/905,599, filed on Sep. 25, 2019.

(51) Int. Cl.
| | |
|---|---|
| *H04N 5/265* | (2006.01) |
| *H04N 5/77* | (2006.01) |
| *H04N 5/92* | (2006.01) |
| *H04N 23/45* | (2023.01) |
| *H04N 23/667* | (2023.01) |
| *H04N 23/80* | (2023.01) |
| *H04N 23/951* | (2023.01) |
| *H04N 23/958* | (2023.01) |

(52) U.S. Cl.
CPC ............... *H04N 5/265* (2013.01); *H04N 5/77* (2013.01); *H04N 5/9205* (2013.01); *H04N 23/45* (2023.01); *H04N 23/667* (2023.01); *H04N 23/80* (2023.01); *H04N 23/951* (2023.01); *H04N 23/958* (2023.01)

(58) Field of Classification Search
None
See application file for complete search history.

(56) References Cited

U.S. PATENT DOCUMENTS

| | | | | |
|---|---|---|---|---|
| 11,375,138 B1 * | 6/2022 | Lindmeier | ............. | H04N 23/45 |
| 11,856,313 B2 * | 12/2023 | Lindmeier | ............. | H04N 5/265 |

(Continued)

*Primary Examiner* — Eileen M Adams

(74) *Attorney, Agent, or Firm* — Fernando & Partners, LLP

(57) ABSTRACT

A method includes recording a first video stream characterized by a first value of a first quality characteristic. The method includes determining that the first video stream satisfies a trigger criterion. The trigger criterion characterizes a threshold amount of video content change information. The method includes, in response to determining that the first video stream satisfies the trigger criterion, obtaining a second video stream characterized by a second value of a second quality characteristic. The second video stream includes scene information also included in the first video stream. The second value of the second quality characteristic is indicative of a higher quality video stream than the first value of the first quality characteristic. The method includes generating a third video stream by adding information from the second video stream to the first video stream. The third video stream corresponds to a higher quality version of the first video stream.

20 Claims, 15 Drawing Sheets

(56)     References Cited

U.S. PATENT DOCUMENTS

2013/0135427 A1*   5/2013   Wu ................. H04N 21/23439
                                                348/14.09
2014/0149060 A1*   5/2014   Meduna ............... G06F 1/3206
                                                702/94
2015/0355815 A1*   12/2015  Palti-Wasserman .........................
                                                G06F 3/04817
                                                715/835
2016/0012609 A1*   1/2016   Laska ................. H04N 23/632
                                                382/103
2018/0315243 A1*   11/2018  Mahler .................. G06F 3/017
2020/0306638 A1*   10/2020  Fear ........................ A63F 13/56

* cited by examiner 200-2 – Second Frame of First Video Stream

201

Electronic Device 100

228

226

224

222

214

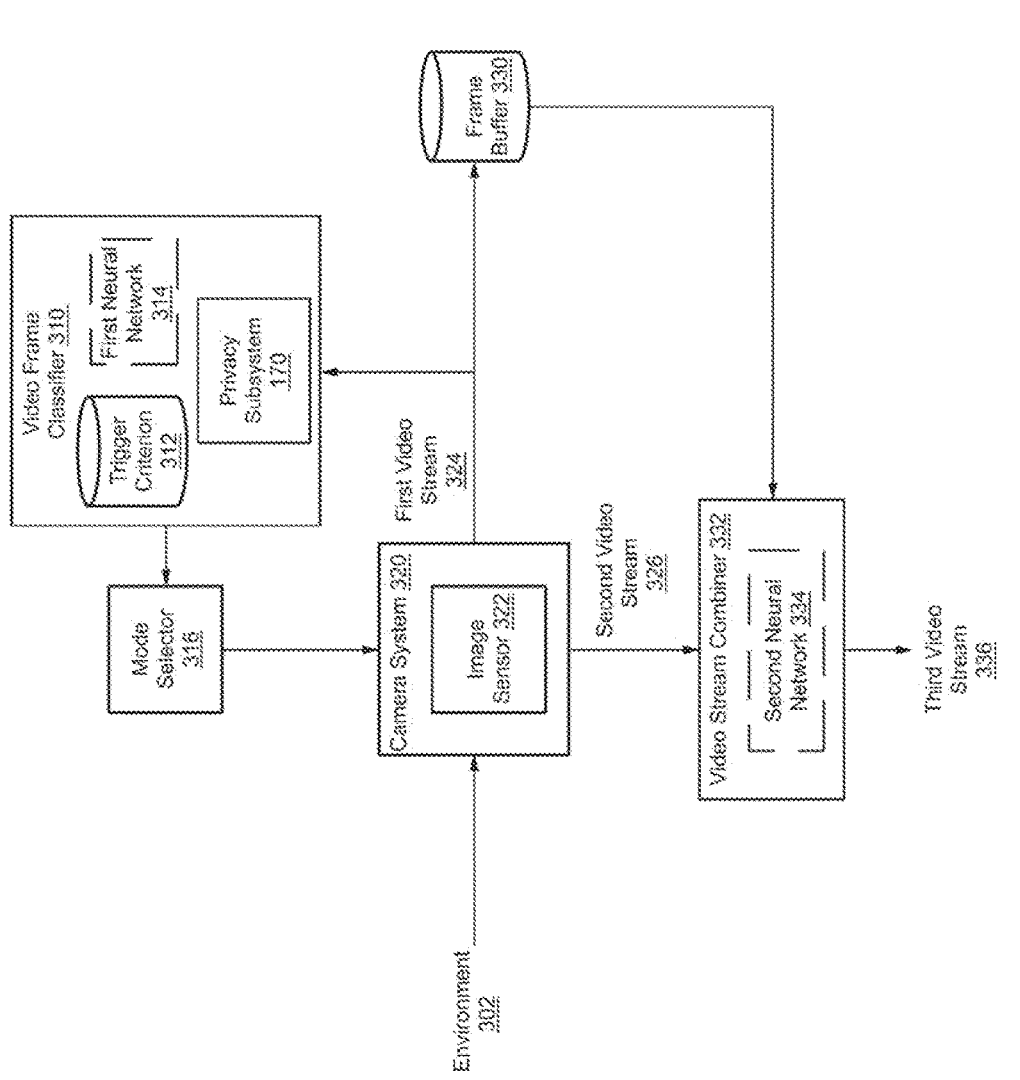
Figure 3

Video Frame Classifier 410

First Neural Network 414

Trigger Criterion 412

Privacy Subsystem 170

Image Sensor Selector 416

Frame Buffer 430

First Video Stream 426

Camera System 420

First Image Sensor 422

Second Image Sensor 424

Second Video Stream 428

Video Stream Container 432

Second Neural Network 434

Third Video Stream 436

Environment 402

Video Frame Classifier 510

First Neural Network 514

Trigger Criterion 512

Privacy Subsystem 170

Frame Buffer 530

First Video Stream 526

Image Sensor Selector 516

Camera System 520

First Image Sensor 522

Second Image Sensor 524

Second Video Stream 528

Video Stream Combiner 532

Second Neural Network 534

Third Video Stream 536

Environmental Sensor Data 546

Environment 502

Environmental Sensor System 540

Depth Sensor 542

Auxiliary Sensor 544

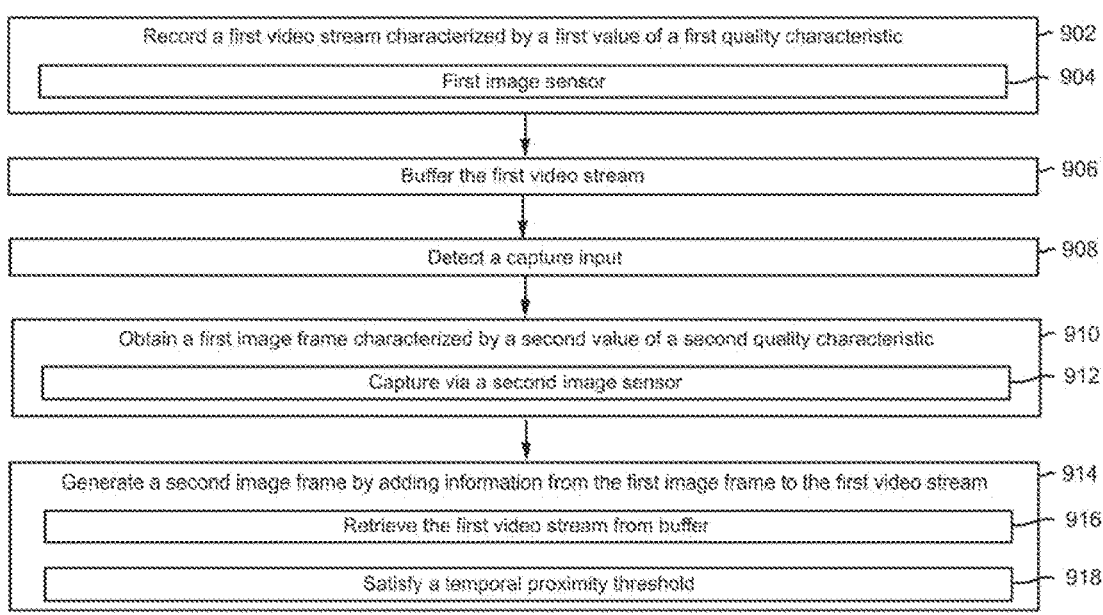

Record a first video stream characterized by a first value of a first quality characteristic ~ 902

First image sensor ~ 904

Buffer the first video stream ~ 906

Detect a capture input ~ 908

Obtain a first image frame characterized by a second value of a second quality characteristic ~ 910

Capture via a second image sensor ~ 912

Generate a second image frame by adding information from the first image frame to the first video stream ~ 914

Retrieve the first video stream from buffer ~ 916

Satisfy a temporal proximity threshold ~ 918

Figure 9

COMBINING VIDEO STREAMS HAVING DIFFERENT INFORMATION-BEARING LEVELS

CROSS-REFERENCE TO RELATED APPLICATIONS

This application is a continuation application of U.S. patent application Ser. No. 17/686,290, filed on Mar. 3, 2022, which is a continuation of U.S. patent application Ser. No. 16/985,095, filed on Aug. 4, 2020, which claims benefit of U.S. Provisional Patent App. No. 62/905,599, filed on Sep. 25, 2019, all of which are hereby incorporated by reference in their entirety.

TECHNICAL FIELD

The present disclosure relates to combining video streams, and, in particular, combining video streams having different information-bearing levels.

BACKGROUND

Power consumption of previously available camera systems is at least partially a function of the video quality of a recorded video stream. Video quality is a function of the amount of information included across a series of video frames and/or in a single video frame. A higher information-bearing video stream typically has a higher video quality than a lower information-bearing video stream. Video quality may be characterized by a variety of metrics that allude to the amount of information in a video stream. Examples of video quality metrics are associated audio, resolution, color range, depth information, frames-per-second (FPS), compression loss, presence of artifacts, signal-to-noise ratio (e.g., peak signal-to-noise ratio (PSNR)), etc.

For some applications, it is desirable for a camera system to constantly (or near-constantly) or persistently record a video stream (without a trigger). Capturing a higher information-bearing video stream consumes more power than capturing a lower information-bearing video stream. Accordingly, constantly capturing a higher information-bearing video stream consumes a greater amount of power than capturing a lower information-bearing video stream. High power consumption is problematic in a number of applications, such as lower battery life in mobile devices, higher processor and memory utilization, and more heat dissipation. Constantly capturing a lower information-bearing video stream comparably consumes less power, with lower processor and memory utilization, and less heat dissipation. However, the lower information-bearing video stream, being of lower quality, is both less desirable and less useful for applications that utilize the video stream. Consequently, downstream performance of applications that utilize the video stream is limited by the video quality, and the amount of information the video stream includes, utilizing previously-known methods.

SUMMARY

In accordance with some implementations, a method is performed at an electronic device with one or more processors, a non-transitory memory, and a camera system. The method includes recording, using the camera system, a first video stream characterized by a first value of a first quality characteristic. The method includes determining that the first video stream satisfies a trigger criterion. The trigger criterion characterizes a threshold amount of video content change information. In some implementations, the method includes, in response to determining that the first video stream satisfies the trigger criterion, obtaining a second video stream characterized by a second value of a second quality characteristic, wherein the second video stream includes scene information also included in the first video stream. The second value of the second quality characteristic is indicative of a higher quality video stream than the first value of the first quality characteristic. In some implementations, the method includes generating a third video stream by adding information from the second video stream to the first video stream. The third video stream corresponds to a higher quality version of the first video stream. In some implementations, the method includes, in response to determining that the first video stream satisfies the trigger criterion, obtaining a video frame characterized by the second value of the second quality characteristic, wherein the video frame includes the scene information also included in the first video stream. In some implementations, the method includes generating the third video stream by adding information from the video frame to the first video stream.

In accordance with some implementations, a method is performed at an electronic device with one or more processors, a non-transitory memory, one or more input devices, and a camera system. The method includes recording, using the camera system, a first video stream characterized by a first value of a first quality characteristic. The method includes, in response to detecting, via the one or more input devices, a capture input, obtaining a first image frame characterized by a second value of a second quality characteristic. The second value of the second quality characteristic is indicative of a higher quality than the first value of the first quality characteristic and the first image frame includes scene information also included in the first video stream. The method includes, in response to detecting the capture input, generating a second image frame by adding information from the first image frame to the first video stream. The second image frame corresponds to a higher quality version of the first video stream.

In accordance with some implementations, an electronic device includes one or more processors, a non-transitory memory, and a camera system. The one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

FIG. 3 is an example of a block diagram for combining video streams including a camera system configured to operate in different modes in accordance with some implementations.

FIG. 5 is another example of a block diagram for combining video streams including a camera system having multiple image sensors in accordance with some implementations.

FIG. 9 is an example of a flow diagram of a method of generating a higher-quality image frame within a video stream by utilizing an input-triggered image frame in accordance with some implementations.

SUMMARY

Figure 1:
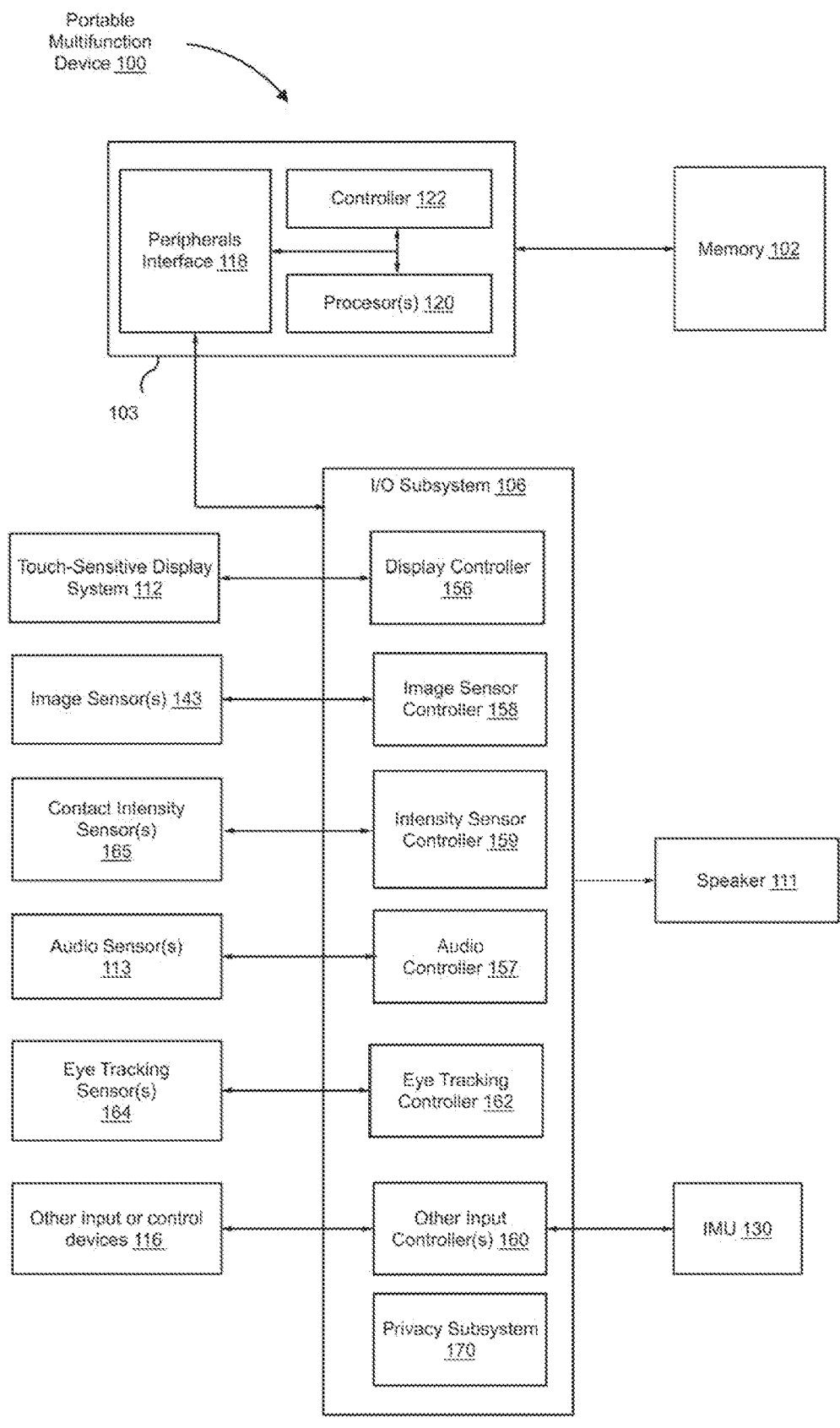
FIG. 1 is a block diagram of an example of a portable multifunction device in accordance with some implementations.

In some circumstances, it is desirable for a camera system to constantly record a video stream without a trigger. Capturing a higher information-bearing video stream consumes more power than capturing a lower information-bearing video stream. Accordingly, constantly capturing a higher information-bearing video stream consumes a greater amount of power than capturing a lower information-bearing video stream. High power consumption is problematic in a number of applications, such as lower battery life in mobile devices, higher processor and memory utilization, and more heat dissipation. Constantly capturing a lower information-bearing video stream comparably consumes less power, with lower processor and memory utilization, and less heat dissipation. However, the lower information-bearing video stream, being of lower quality, is both less desirable and less useful for applications that utilize the video stream. Consequently, downstream performance of applications that utilize the video stream is limited by the video quality, and the amount of information the video stream includes.

By contrast, various implementations disclosed herein provide methods, electronic devices, and systems that improve video quality of a low information-bearing video stream. The video quality of the low information-bearing video stream is improved by utilizing a higher quality, high information-bearing video stream that is obtained proximate-in-time to recording the low information-bearing video stream. An electronic device obtains the high information-bearing video stream when the low information-bearing video stream satisfies a trigger criterion, such as when the low information-bearing video stream includes salient change information. The electronic device adds information from the high information-bearing video stream to the low information-bearing video stream in order to improve the quality of the low information-bearing video stream while maintaining scene information of the low information-bearing video stream. Accordingly, a constant capture of the high information-bearing video stream is avoided, reducing power consumption by the electronic device.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a touch-sensitive display system 112, an inertial measurement unit (IMU) 130, image sensor(s) 143 (e.g., a camera), contact intensity sensor(s) 165, audio sensor(s) 113 (e.g., microphone), eye tracking sensor(s) 164 (e.g., included within a head-mountable device (HMD)), and other input or control device(s) 116. In some implementations, the electronic device 100 corresponds to one of a mobile phone, tablet, laptop, wearable computing device, head-mountable device (HMD), head-mountable enclosure (e.g. the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more CPUs 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the touch-sensitive display system 112 and the other input or control devices 116, with the peripherals interface 118. The I/O subsystem 106 optionally includes a display controller 156, an image sensor controller 158, an intensity sensor controller 159, an audio controller 157, an eye tracking controller 162, and one or more input controllers 160 for other input or control devices, and a privacy subsystem 170. The one or more input controllers 160 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 160 are, optionally, coupled with any (or none) of the following: a keyboard, infrared port, Universal Serial Bus (USB) port, stylus, and/or a pointer device such as a mouse. The one or more buttons optionally include an up/down button for volume control of the speaker 111 and/or audio sensor(s) 113. The one or more buttons optionally include a push button. In some implementations, the other input or control devices 116 includes a positional system (e.g., GPS) that obtains information concerning the location and/or orientation of the electronic device 100 relative to a physical environment.

The touch-sensitive display system 112 provides an input interface and an output interface between the electronic device 100 and a user. The display controller 156 receives and/or sends electrical signals from/to the touch-sensitive display system 112. The touch-sensitive display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The touch-sensitive display system 112 has a touch-sensitive surface, sensor, or set of sensors that accepts input from the user based on haptic and/or tactile contact. The touch-sensitive display system 112 and the display controller 156 (along with any associated modules and/or sets of instructions in the memory 102) detect contact (and any movement or breaking of the contact) on the touch-sensitive display system 112 and converts the detected contact into interaction with user-interface objects (e.g., one or more soft keys, icons, web pages or images) that are displayed on the touch-sensitive display system 112. In an example implementation, a point of contact between the touch-sensitive display system 112 and the user corresponds to a finger of the user or a stylus.

The touch-sensitive display system 112 optionally uses LCD (liquid crystal display) technology, LPD (light emitting polymer display) technology, or LED (light emitting diode) technology, although other display technologies are used in other implementations. The touch-sensitive display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive display system 112.

The user optionally makes contact with the touch-sensitive display system 112 using any suitable object or appendage, such as a stylus, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) 143 corresponds to one or more HMD cameras. In some implementations, the image sensor(s) 143 includes one or more depth sensors. In some implementations, the image sensor(s) 143 includes a combination of a black-and-white (BW) camera and an infrared (IR) camera.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the back of the electronic device 100.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

In various implementations, the electronic device 100 includes a privacy subsystem 170 that includes one or more privacy setting filters associated with user information, such as user information included in the eye gaze data and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

FIGS. 2A-2I are an example of an electronic device 100 combining video streams having different information-bearing levels in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

In some implementations, the electronic device 100 corresponds to a mobile device, such as a smartphone, tablet, media player, laptop, etc. In some implementations, the electronic device 100 corresponds to a head-mountable device (HMD) that includes an integrated display (e.g., a built-in display) that displays the plurality of sequential images. In some implementations, the HMD includes a head-mountable enclosure. In various implementations, the head-mountable enclosure includes an attachment region to which another device with a display can be attached. In various implementations, the head-mountable enclosure is shaped to form a receptacle for receiving another device that includes a display. For example, in some implementations, the electronic device 100 slides/snaps into or otherwise attaches to the head-mountable enclosure. In some implementations, the display of the device attached to the head-mountable enclosure presents (e.g., displays) the plurality of sequential images. For example, in some implementations, the electronic device 100 corresponds to a mobile phone that can be attached to the head-mountable enclosure.

Figure 2A:
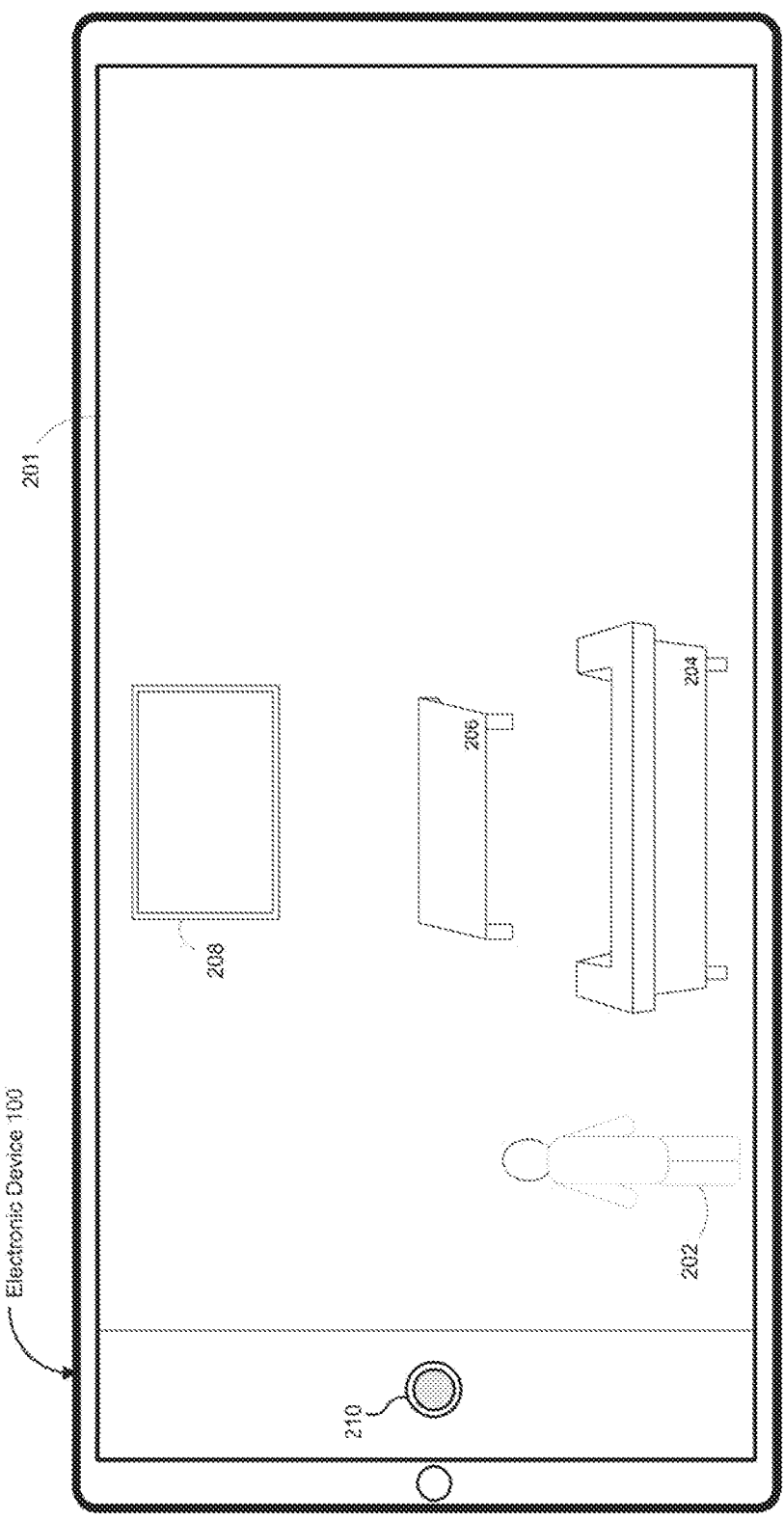
FIGS. 2A-2I are an example of an electronic device combining video streams having different information-bearing levels in accordance with some implementations.

In some implementations, as illustrated in FIG. 2A, the electronic device 100 includes a graphical user interface 201 that displays various objects and a record affordance 210, which, when selected, requests the electronic device 100 to record a video stream of the objects. The objects include a person 202, a couch 204, a table 206, and a television 208.

On the other hand, in some implementations, the electronic device 100 records a video stream independent of detecting a user input directed to the record affordance 210. For example, in some implementations, the electronic device 100 records the video stream in response to detecting activation of the electronic device 100 (e.g., when a user wears the electronic device 100) or in response to detecting (e.g., via the IMU 130 illustrated in FIG. 1) a positional change input that moves the electronic device 100 from a first position (e.g., a first pose) to a second position (e.g., a second pose).

Figure 2B:
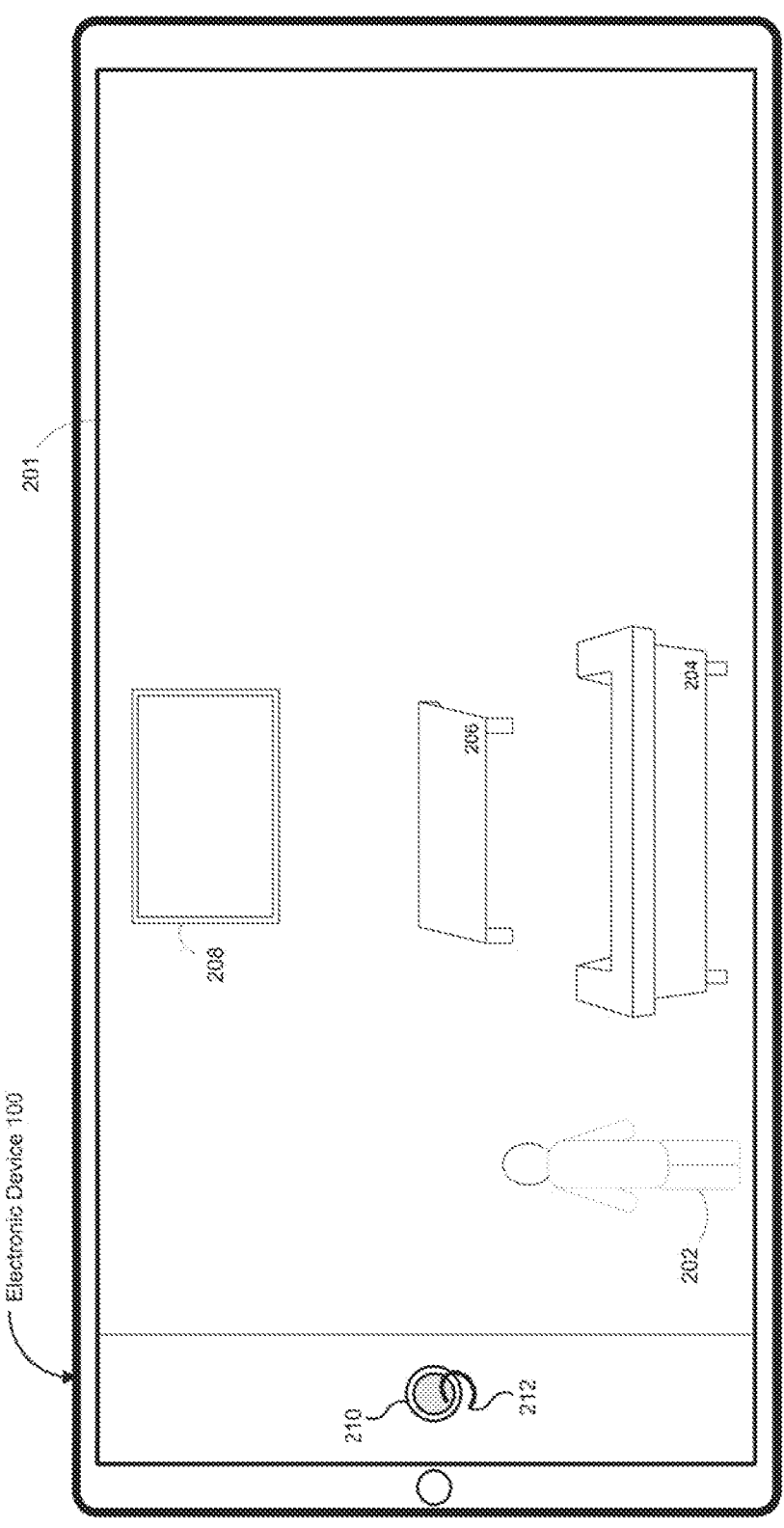

As illustrated in FIG. 2B, the electronic device 100 detects an input 212 directed to the record affordance 210. In some implementations, selecting the record affordance 210 requests the electronic device 100 to generate a video file (e.g., .MPEG, .MOV) associated with a video stream. In some implementations, selecting the record affordance 210 requests the electronic device 100 to enter a burst photo mode. When in the burst photo mode, the electronic device 100 continually captures a sequence of images, saving the most recent set of images in a buffer. In various implementations, the buffer includes approximately 1.5 seconds of images at approximately 15 frames per second. In various implementations, the buffer includes approximately 1.5 seconds of image at 20, 24, or 30 frames per second. In some implementations, selecting the record affordance 210 requests the electronic device 100 to capture a single image frame.

Figure 2C:
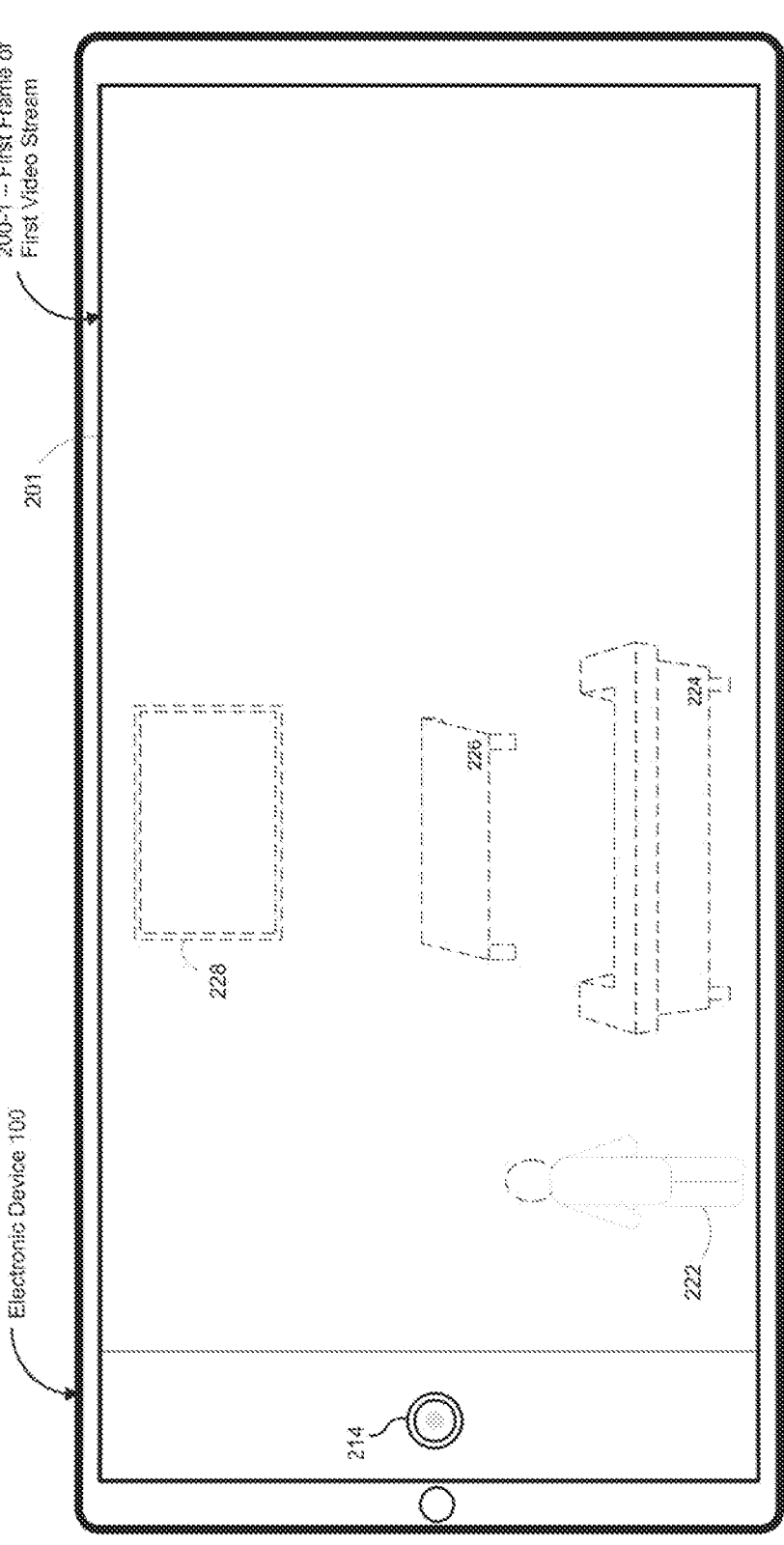

In response to detecting the input 212 in FIG. 2B, the electronic device 100 records a first frame 200-1 of a first video stream, as illustrated in FIG. 2C. The electronic device 100 replaces the record affordance 210 with a recording indicator 214 in order to indicate that the electronic device 100 is recording the first video stream. The first video stream is characterized by a first value of a first quality characteristic. In some implementations, the first quality characteristic corresponds to a relatively low information-bearing level associated with the first video stream. For example, the first frame 200-1 of the first video stream includes lower-resolution versions of the corresponding objects illustrated in FIGS. 2A and 2B, as indicated by dashed-line representations of the objects in FIG. 2C. Namely, the first frame 200-1 of the first video stream includes a lower-resolution person 222, a lower-resolution couch 224, a lower-resolution table 226, and a lower-resolution television 228.

In some implementations, the electronic device 100 records the first video stream in a first mode of operation, such as a low-resolution capture mode of operation. In some implementations, the electronic device 100 includes multiple image sensors of different capture resolutions, and the electronic device 100 records the first video stream using a low-resolution image sensor. For example, the electronic device 100 utilizes a black-and-white camera to record the first video stream.

Figure 2D:
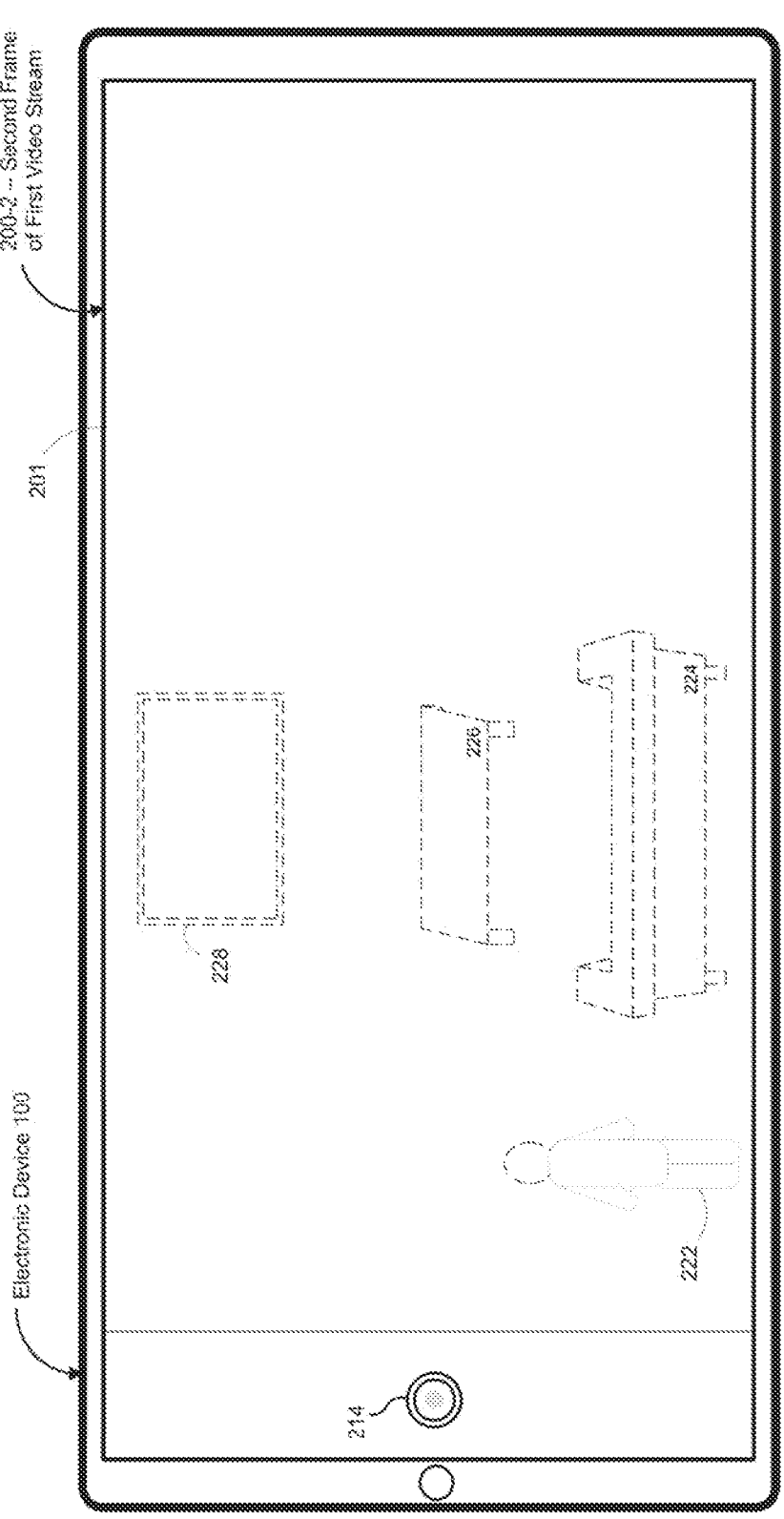

As illustrated in FIG. 2D, the electronic device 100 records a second frame 200-2 of the first video stream. The first frame 200-1 and the second frame 200-2 are temporally related to each other. In some implementations, the electronic device 100 determines that the first and second frames 200-1 and 200-2 do not satisfy a trigger criterion because they do not collectively include a threshold amount of video content change information. Namely, neither of the lower-resolution person 222, the lower-resolution couch 224, the lower-resolution table 226, nor the lower-resolution television 228 adequately change positions between the first frame 200-1 and the second frame 200-2. Accordingly, the electronic device 100 captures the second frame 200-2 according to the first value of the first quality characteristic.

Figure 2E:
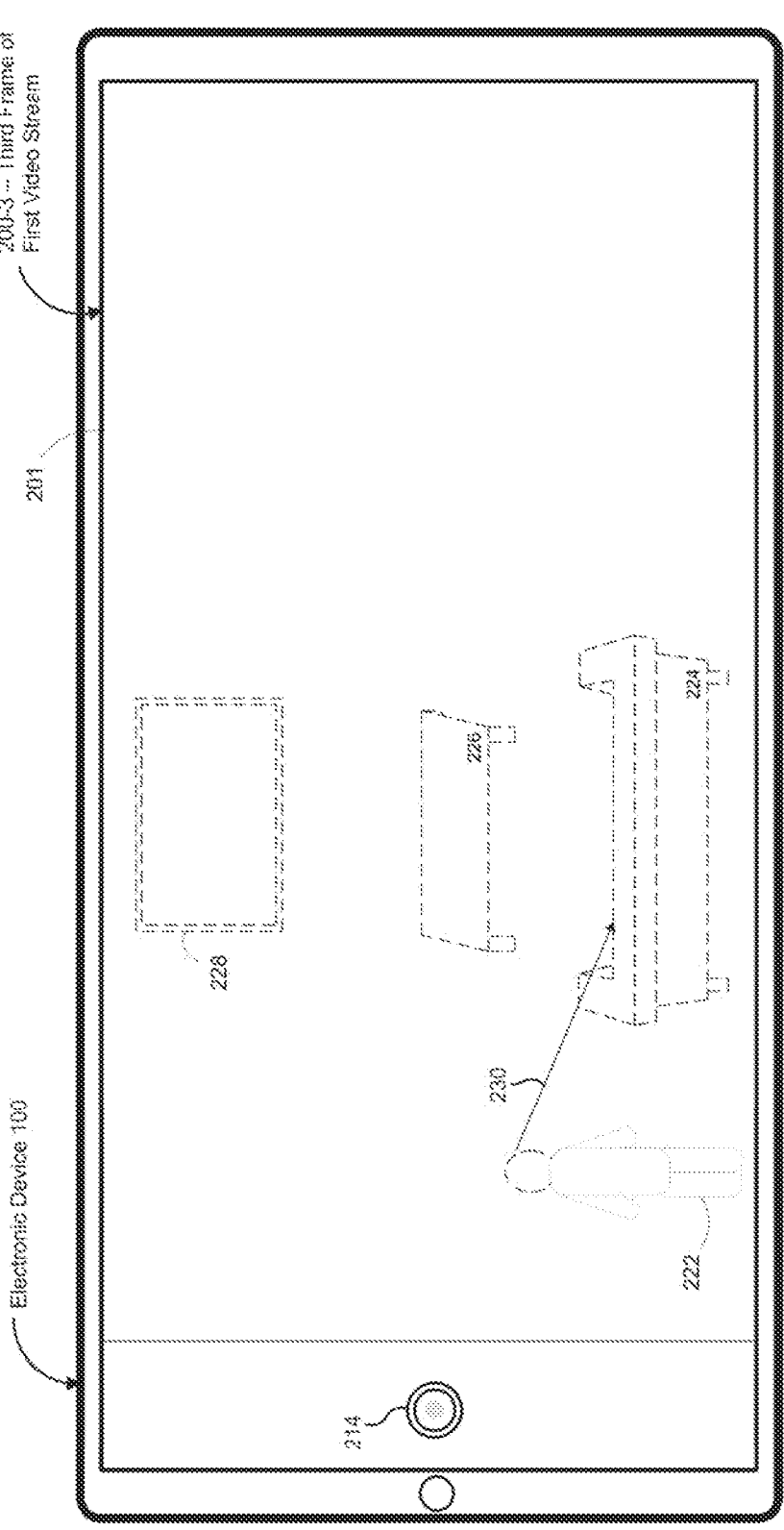

As illustrated in FIG. 2E, the electronic device 100 records a third frame 200-3 of the first video stream. The first frame 200-1, the second frame 200-2, and the third frame 200-3 are temporally related to each other. In some implementations, the electronic device 100 determines that the first, second, and third frames 200-1-200-3 do not satisfy a trigger criterion because they do not collectively include a threshold amount of video content change information. Namely, neither the lower-resolution person 222, the lower-resolution couch 224, the lower-resolution table 226, nor the lower-resolution television 228 adequately change positions between the first frame 200-1, the second frame 200-2, and the third frame 200-3. Accordingly, the electronic device 100 captures the third frame 200-3 according to the first value of the first quality characteristic. Moreover, as illustrated for purely explanatory purposes in FIG. 2E, an arrow 230 indicates that the person 202 is beginning to move towards the couch 204.

Figure 2F:
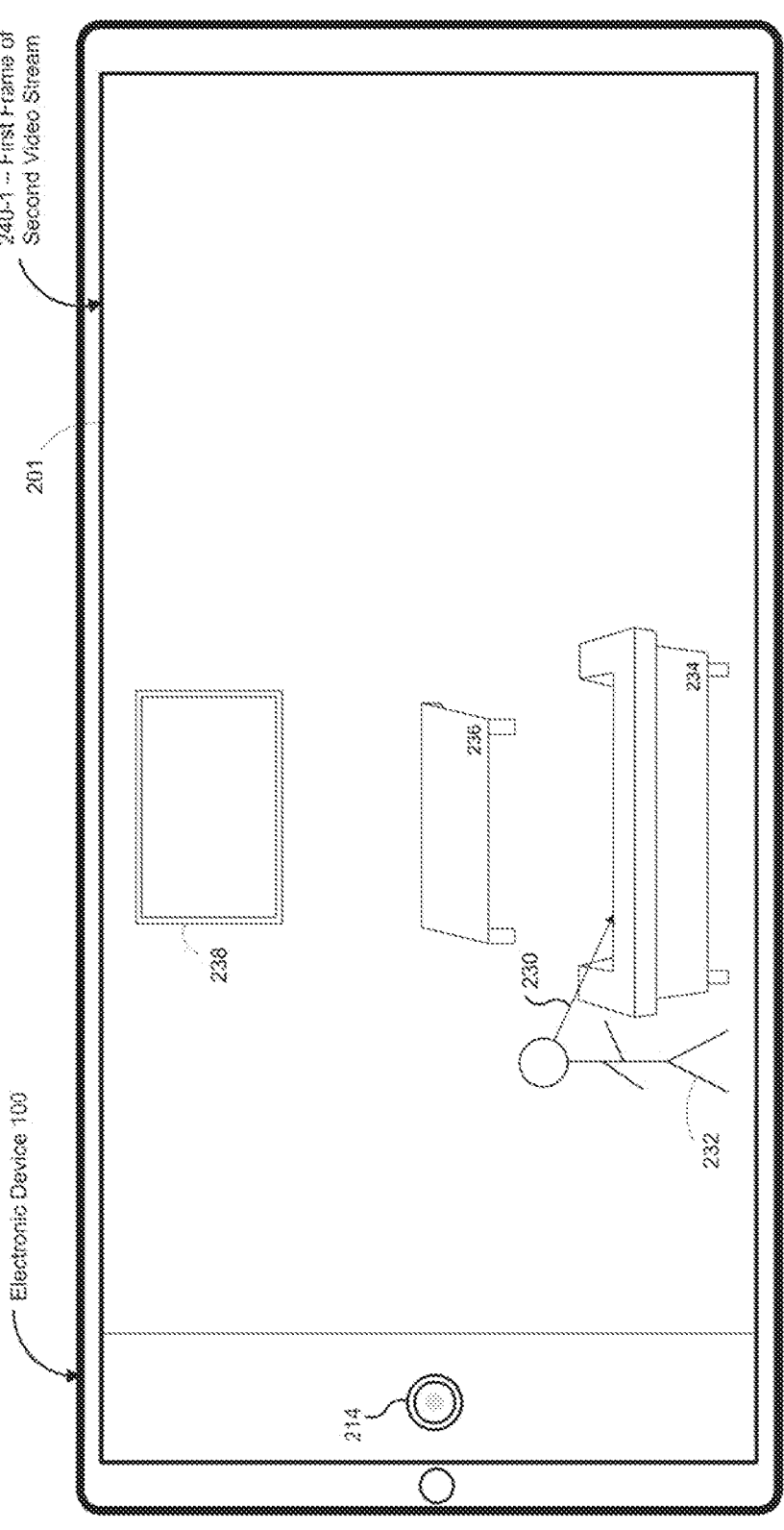

As illustrated in FIG. 2F, the person 202 has moved closer to the couch 204, and, in response, the electronic device 100 determines that the first video stream satisfies the trigger criterion. Accordingly, the electronic device 100 obtains a first frame 240-1 of a second video stream, as illustrated in FIG. 2F. The second video stream is characterized by a second value of a second quality characteristic. The second value of the second quality characteristic is indicative of a higher quality video stream than the first value of the first quality characteristic. The second video stream includes scene information also included in the first video stream. For example, as illustrated in FIG. 2F, the first frame 240-1 of the second video stream includes solid-line, higher-resolution objects, whereas the first video stream illustrated in FIGS. 2C-2E includes dashed-line, lower-resolution objects. Namely, the first frame 240-1 of the second video stream includes a higher-resolution person 232, a higher-resolution couch 234, a higher-resolution table 236, and a higher-resolution television 238.

In some implementations, the electronic device 100 obtains the second video stream in a second mode of operation, such as a high-resolution capture mode of operation. In some implementations, the electronic device 100 includes image sensors of different capture resolutions, and the electronic device 100 records the second video stream using a high-resolution image sensor, such as a red-green-blue (RGB) camera. In some implementations, the electronic device 100 includes a combination of multiple image sensors and other environmental sensors (e.g., a depth sensor), and the electronic device 100 records the second video stream using a high-resolution image sensor and the other environmental sensors.

Figure 2G:
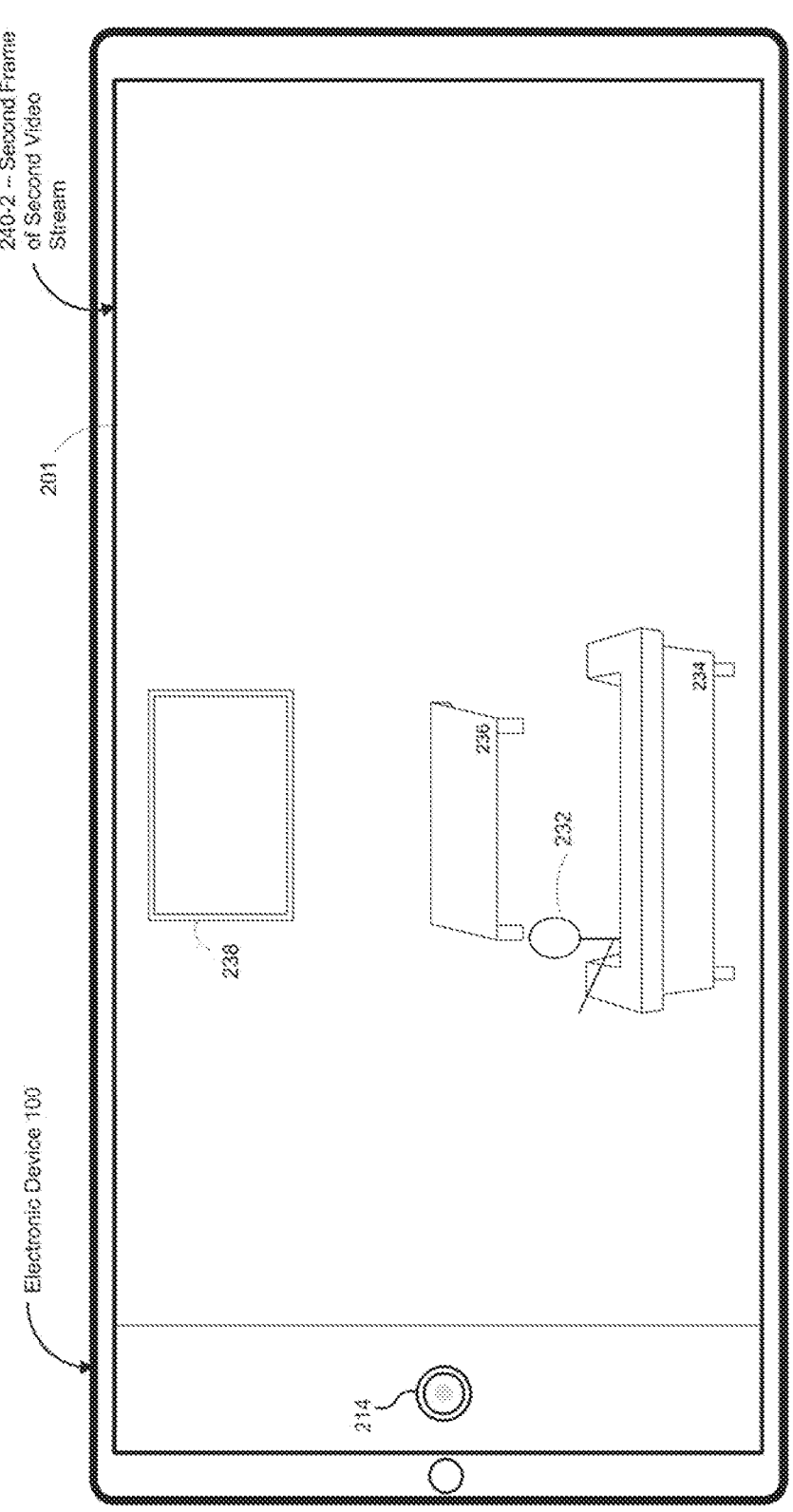

As illustrated in FIG. 2G, the person 202 has moved further and is sitting on the couch 204, and, in response, the electronic device 100 determines that the trigger criterion is satisfied. Accordingly, the electronic device 100 obtains a second frame 240-2 of the second video stream that is characterized by the second value of the second quality characteristic. The second frame 240-2 of the second video stream includes the higher-resolution person 232 sitting on the higher-resolution couch 234, the higher-resolution table 236, and the higher-resolution television 238.

Figures 2H, 2I:
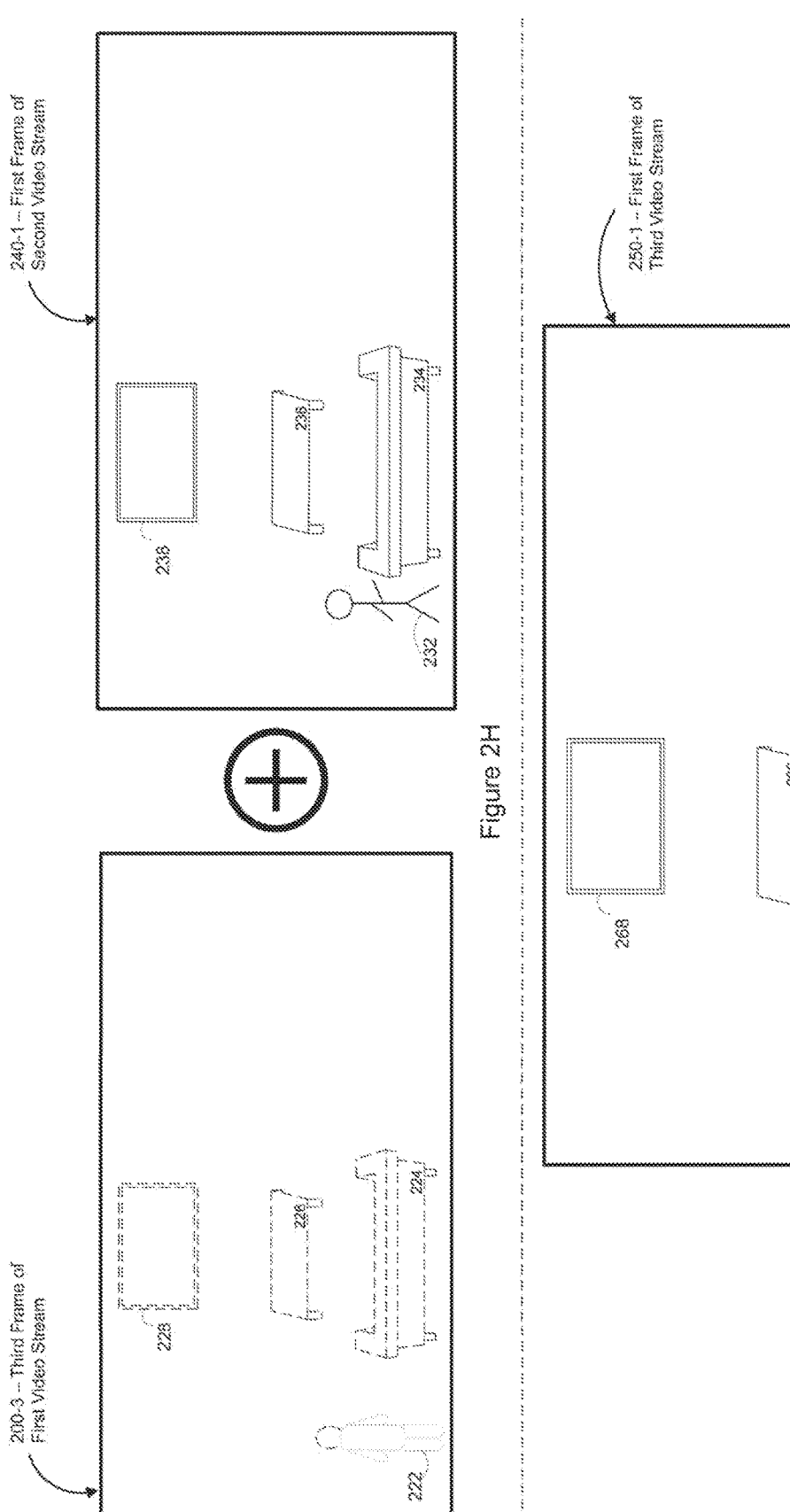

As illustrated in FIGS. 2H and 2I, the electronic device 100 generates a first frame 250-1 of a third video stream based on the third frame 200-3 of the first video stream and the first frame 240-1 of the second video stream. The electronic device 100 adds information from the first frame 240-1 of the second video stream to the third frame 200-3 of the first video stream in order to generate the first frame 250-1 of the third video stream. For example, the electronic device 100 adds additional pixel information from the higher-resolution, first frame 240-1 of the second video stream to the lower-resolution, third frame 200-3 of the first video stream. Accordingly, the first frame 250-1 of the third video stream corresponds to a higher quality version of the third frame 200-3 of the first video stream. In some implementations, the electronic device 100 buffers the third frame 200-3 of the first video stream in order to enable later adding, to the third frame 200-3 of the first video stream, information from the first frame 240-1 of the second video stream. The first frame 250-1 of the third video stream includes a higher-resolution person 262, a higher-resolution couch 264, a higher-resolution table 266, and a higher-resolution television 268.

FIG. 3 is an example of a block diagram 300 for combining video streams including a camera system 320 configured to operate in different modes in accordance with some implementations. The camera system 320 includes an image sensor 322 that is configured to record a first video stream 324 of an environment 302 in a first mode of operation. In some implementations, the environment 302 corresponds to a physical environment. In some implementations, the environment 302 corresponds to a computer-generated reality (CGR) environment, such as a pure virtual reality (VR) environment, an augmented reality (AR) environment. or a mixed reality environment. In some implementations, the camera system 320 buffers the first video stream 324 in a frame buffer 330 for later processing.

The block diagram 300 includes a video frame classifier 310 that classifies the first video stream 324. For example, with reference to FIG. 2B, the video frame classifier 310 classifies the objects 222-228 within the first frame 200-1 of the first video stream. In some implementations, the video frame classifier 310 classifies the first video stream 324 by utilizing a combination of instance segmentation (e.g., "Object No. 1," Object No. 2," etc.) and semantic segmentation ("person," "table," etc.). In some implementations, the video frame classifier 310 includes a first neural network 314 that classifies the first video stream 324. Based on the classification, the video frame classifier 310 determines whether the first video stream 324 satisfies a trigger criterion 312 that characterizes a threshold amount of video content change information. For example, the video frame classifier 310 determines that the first video stream 324 satisfies the trigger criterion 312 because there is a threshold amount of movement of an object within the first video stream 324.

The video frame classifier 310 includes the privacy subsystem 170. In some implementations, the privacy subsystem 170 selectively prevents and/or limits an electronic device from obtaining, buffering, and/or transmitting sensitive user information, such as identifying features (e.g., eye color) of the user 202 in FIG. 2B. In some implementations, the privacy subsystem 170 scrambles or obscures the user information in order to prevent user identification.

The video frame classifier 310 provides the result of the determination of whether the first video stream 324 satisfies the trigger criterion 312 to a mode selector 316. The mode selector 316 selects a mode of operation for the camera system 320. In some implementations, the mode selector 316 sets the camera system 320 to a first mode of operation in which the camera system 320 records the first video stream 324. In response to receiving, from the video frame classifier 310, a result that the first video stream 324 satisfies the trigger criterion 312, the mode selector 316 sets the camera system 320 to a second mode of operation in which the camera system 320 records a second video stream 326. The second video stream 326 is characterized by a second value of a second quality characteristic that is indicative of a higher quality video stream than a first value of a first quality characteristic characterizing the first video stream 324. For example, the second video stream 326 is a higher information-bearing video stream (e.g., higher resolution, more colors, more depth information, etc.) than the first video stream 324.

The block diagram 300 includes a video stream combiner 332 that generates a third video stream 336 by adding information from the second video stream 326 to the first video stream 324. The third video stream 336 corresponds to a higher quality version of the first video stream 324. In some implementations, the video stream combiner 332 includes a second neural network 334 that extracts the information from the second video stream 326. For example, the video stream combiner 332 adds pixel information corresponding to objects within the second video stream 326 to the objects within the first video stream 324 in order to effectively upscale the first video stream 324.

Figure 4:
FIG. 4 is an example of a block diagram for combining video streams including a camera system having multiple image sensors in accordance with some implementations.

FIG. 4 is an example of a block diagram 400 for combining video streams including a camera system 420 having multiple image sensors in accordance with some implementations. The block diagram 400 includes various components that are similar to and adapted from corresponding components of the block diagram 300 illustrated in FIG. 3. Discussion of these components is omitted for the sake of brevity.

The camera system 420 includes a first image sensor 422 that is configured to record a first video stream 426 and a second image sensor 424 configured to record a second video stream 428. In some implementations, the camera system 420 buffers the first video stream 426 in a frame buffer 430. The first video stream 426 is characterized by a first value of a first quality characteristic that is indicative of a lower quality video stream than a second value of a second quality characteristic characterizing the second video stream 428. In some implementations, the first image sensor 422 is configured to record a lower information-bearing video stream than the second image sensor 424 is configured to record. To that end, in some implementations, the first image sensor 422 corresponds to a low-resolution image sensor (e.g., a black-and-white camera and/or an infrared (IR) camera), whereas the second image sensor 424 corresponds to a high-resolution image sensor (e.g., an RGB camera).

Based on whether a video frame classifier 410 classifies the first video stream 426 as satisfying a trigger criterion 412, an image sensor selector 416 selects either the first image sensor 422 or the second image sensor 424 for capturing a respective video stream. In response to receiving an indicator from the video frame classifier 410 that the first video stream 426 satisfies the trigger criterion 412, the image sensor selector 416 instructs the camera system 420 to switch from the first image sensor 422 to the second image sensor 424. The second image sensor 424 is configured to record the second video stream 428 of the environment 402. In some implementations, in response to receiving an indicator from the video frame classifier 410 that the first video stream 426 ceases to satisfy the trigger criterion 412, the image sensor selector 416 instructs the camera system 420 to switch from the second image sensor 424 to the first image sensor 422. By selectively switching between the first image sensor 422 and the second image sensor 424, the block diagram 400 utilizes fewer processing resources and produces less heat than by continuously using the second image sensor 424 to record a high information-bearing video stream.

The block diagram 400 includes a video stream combiner 432 that generates a third video stream 436 by adding information from the second video stream 428 to the first video stream 426. In some implementations, the video stream combiner 432 adds information from the second video stream 428 to video frames of the first video stream 436 obtained from the frame buffer 430.

FIG. 5 is another example of a block diagram 500 for combining video streams including a camera system 520 having multiple image sensors in accordance with some implementations. The block diagram 500 includes various components that are similar to and adapted from corresponding components of the block diagram 400 in FIG. 4. Discussion of these components is omitted for the sake of brevity.

Notably, the block diagram 500 includes an environment sensor system 540 that includes sensors that obtain environmental sensor data 546 associated with an environment 502. For example, the environment sensor system 540 includes a depth sensor 542 and an auxiliary sensor 544 (e.g., audio sensor, GPS sensor, etc.). The depth sensor 542 detects depth information associated with the environment 502. For example, with reference to FIG. 2A, the depth sensor 542 detects depth information indicating that the couch 204 is in the foreground, whereas the television 208 is in the background. In some implementations, a video stream combiner 532 generates a third video stream 536 by adding the environmental sensor data 546 (e.g., the depth information) to a first video stream 526, in addition to adding information from a second video stream 528 to the first video stream 526. Because the third video stream 536 includes components of both the environmental sensor data 546 and the second video stream 528, the third video stream 536 may provide a higher-quality video stream than were the third video stream 536 to consist of a combination of video streams.

Figure 6:
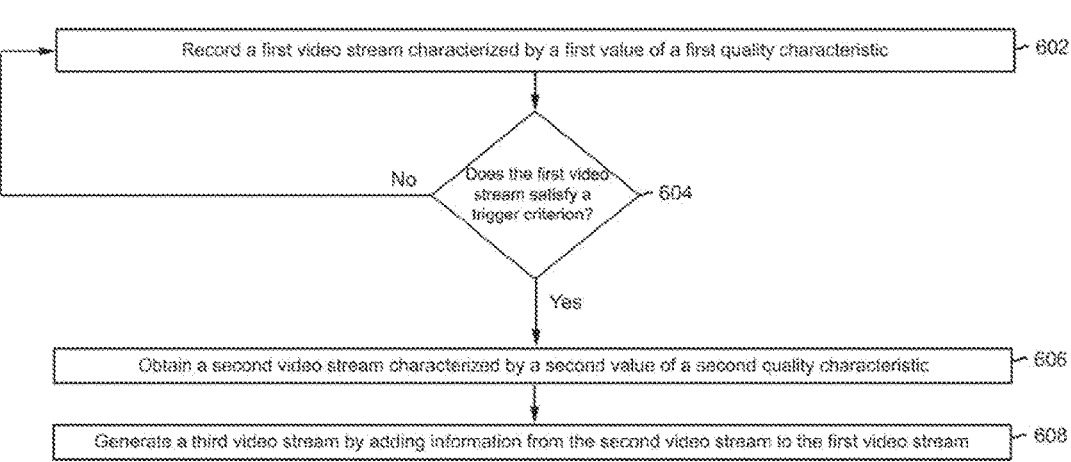
FIG. 6 is an example of a flow diagram of a method of combining video streams having different information-bearing levels in accordance with some implementations.

FIG. 6 is an example of a flow diagram of a method 600 of combining video streams having different information-bearing levels in accordance with some implementations. In various implementations, the method 600 or portions thereof are performed by an electronic device (e.g., the electronic device 100 in FIG. 1 or the electronic device 100 in FIGS. 2A-2I). In various implementations, the method 600 or portions thereof are performed by one of the block diagram 300 in FIG. 3, the block diagram 400 in FIG. 4, or the block diagram 500 in FIG. 5. In various implementations, the method 600 or portions thereof are performed by a head-mountable device (HMD) including an integrated display. In some implementations, the method 600 is performed by processing logic, including hardware, firmware, software, or a combination thereof. In some implementations, the method 600 is performed by a processor executing code stored in a non-transitory computer-readable medium (e.g., a memory).

As represented by block 602, the method 600 includes recording a first video stream characterized by a first value of a first quality characteristic. As one example, with reference to FIGS. 2C-2E, the electronic device 100 records three video frames 200-1-200-3 of a first video stream. For example, the first video stream includes temporally related frames. As another example, the first quality characteristic corresponds to one of a low-resolution characteristic, a monochromatic characteristic, a low frames-per-second (FPS) characteristic, a low depth information characteristic, a low texture information characteristic, and/or the like.

As represented by block 604, the method 600 includes determining whether or not the first video stream satisfies a trigger criterion. The trigger criterion characterizes a threshold amount of video content change information. In some implementations, machine learning, such as a neural network, determines whether the first video stream satisfies the trigger criterion. For example, the neural network is trained to identify salient objects within the first video stream. As one example, the first video stream satisfies the trigger criterion when the first video stream includes an object that matches, within a threshold level, a salient object known by the neural network. As another example, the trigger criterion is satisfied when the first video stream includes a threshold level of change in one or more objects within the first video stream, such as a person walking as illustrated in FIGS. 2F and 2G. As yet another example, the trigger criterion is satisfied when the first video stream includes an object of an object type that corresponds to a predefined object type list. For example, the object is a living entity, such as a person or an animal. In some implementations, determining whether or not the first video stream satisfies the trigger criterion is performed on a per-pixel basis.

In some implementations, in response to determining that the first video stream does not satisfy the trigger criterion ("No"), the method 600 reverts back to a portion of the method 600 represented by block 602. On the other hand, in response to determining that the first video stream satisfies the trigger criterion ("Yes"), the method 600 includes obtaining (e.g., recording) a second video stream, as represented by block 606. The second video stream is characterized by a second value of a second quality characteristic. The second value of the second quality characteristic is indicative of a higher quality video stream than the first value of the first quality characteristic. The second video stream includes scene information also included in the first video stream. As one example, with reference to FIGS. 2F and 2G, the electronic device 100 obtains frames 240-1 and 240-2 of a second video stream. In some implementations, the first and second quality characteristics are of the same type (e.g., resolution, depth level, brightness level, color spectrum, FPS, etc.), but have different values. In some implementations, the scene information matches corresponding content in the first video stream within a threshold level. For example, a fast-changing video stream (e.g., flashing lights) may result in the difference not satisfying the threshold level.

As represented by block 608, the method 600 includes generating a third video stream by adding information from the second video stream to the first video stream. The third video stream corresponds to a higher quality version of the first video stream. As one example, with reference to FIGS. 2H and 2I, the electronic device generates the first frame 250-1 of the third video stream by adding information (e.g., additional pixel information, additional colors, additional depth, etc.) from the first frame 240-1 of the second video stream to the third frame 200-3 of the first video stream. For example, the higher quality attributes of the third video stream corresponds to one or more of: higher resolution, higher audio quality, higher color range, higher frames-per-second, fewer artifacts, higher signal-to-noise ratio (SNR), etc. In some implementations, the method 600 includes extracting the information from the second video stream, such as by a neural network.

Figure 7:
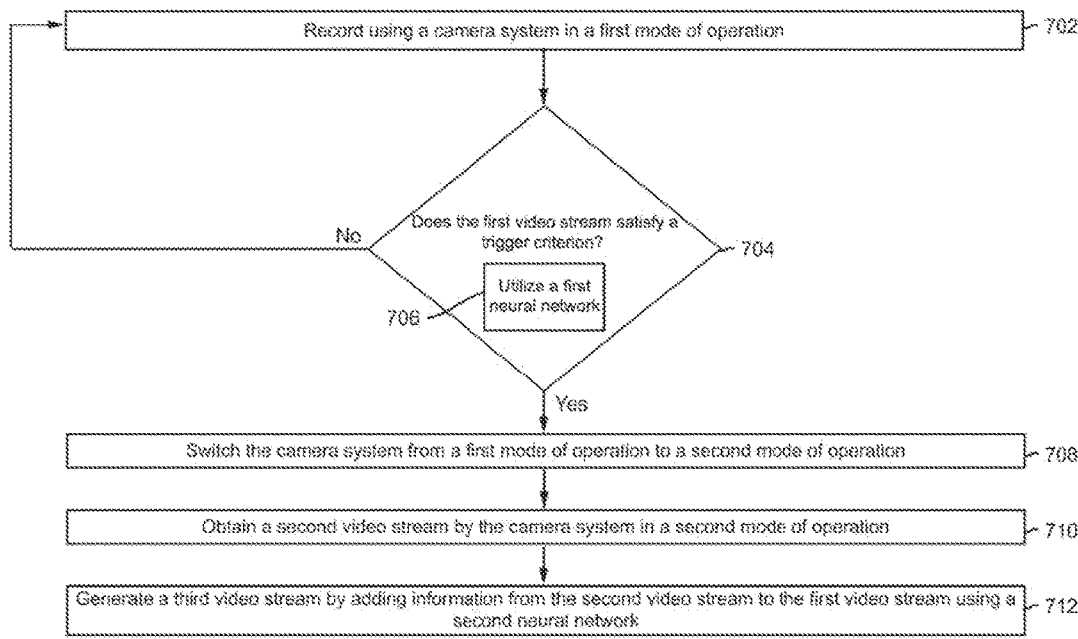
FIG. 7 is an example of a flow diagram of a method of combining video streams that were recorded by a camera system in different modes of operation in accordance with some implementations.

FIG. 7 is an example of a flow diagram of a method 700 of combining video streams that were recorded by a camera system in different modes of operation in accordance with some implementations. In various implementations, the method 700 or portions thereof are performed by an electronic device (e.g., the electronic device 100 in FIG. 1 or the electronic device 100 in FIGS. 2A-2I). In various implementations, the method 700 or portions thereof are performed by one of the block diagram 300 in FIG. 3, the block diagram 400 in FIG. 4, or the block diagram 500 in FIG. 5. In various implementations, the method 700 or portions thereof are performed by a head-mountable device (HMD) including an integrated display. In some implementations, the method 700 is performed by processing logic, including hardware, firmware, software, or a combination thereof. In some implementations, the method 700 is performed by a processor executing code stored in a non-transitory computer-readable medium (e.g., a memory).

As represented by block 702, the method 700 includes recording, using the camera system, a first video stream characterized by a first value of a first quality characteristic. In some implementations, the camera system records the first video stream in a first mode of operation, such as a low-resolution capture mode.

As represented by block 704, the method 700 includes determining whether or not the first video stream satisfies a trigger criterion. The trigger criterion characterizes a threshold amount of video content change information. In some implementations, as represented by block 706, the method 700 includes utilizing a first neural network in order to determine whether or not the first video stream satisfies the trigger criterion.

In some implementations, in response to determining that the first video stream does not satisfy the trigger criterion ("No"), the method 700 reverts back to a portion of the method 700 represented by block 702. On the other hand, in response to determining that the first video stream satisfies the trigger criterion ("Yes"), the method 700 includes switching the camera system from the first mode of operation to a second mode of operation, as represented by block 708. The first mode of operation is associated with a first power profile and the second mode of operation is associated with a second power profile that is larger than the first power profile.

As represented by block 710, the method 700 includes obtaining a second video stream by the camera system in a second mode of operation, such as a high-resolution capture mode. The second video stream is characterized by a second value of a second quality characteristic. The second value of the second quality characteristic is indicative of a higher quality video stream than the first value of the first quality characteristic.

As represented by block 712, the method 700 includes generating a third video stream by adding information from the second video stream to the first video stream using a second neural network. The third video stream corresponds to a higher quality version of the first video stream. In some implementations, the second neural network is a convolutional neural network.

Figure 8:
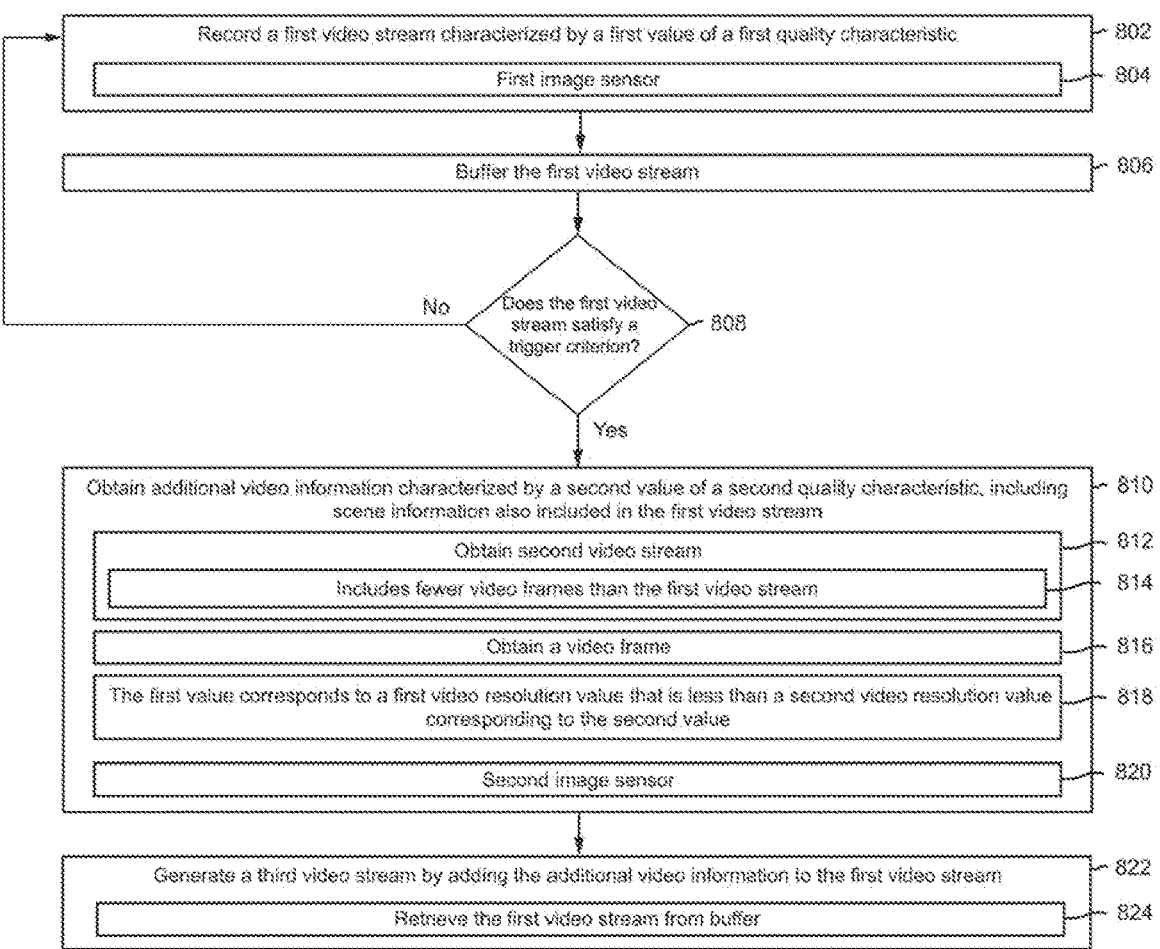
FIG. 8 is an example of a flow diagram of a method of combining video streams that were recorded by different image sensors of a camera system in accordance with some implementations.

FIG. 8 is an example of a flow diagram of a method 800 of combining video streams that were recorded by different image sensors of a camera system in accordance with some implementations. In various implementations, the method 800 or portions thereof are performed by an electronic device (e.g., the electronic device 100 in FIG. 1 or the electronic device 100 in FIGS. 2A-2I). In various implementations, the method 800 or portions thereof are performed by one of the block diagram 300 in FIG. 3, the block diagram 400 in FIG. 4, or the block diagram 500 in FIG. 5. In various implementations, the method 800 or portions thereof are performed by a head-mountable device (HMD) including an integrated display. In some implementations, the method 800 is performed by processing logic, including hardware, firmware, software, or a combination thereof. In some implementations, the method 800 is performed by a processor executing code stored in a non-transitory computer-readable medium (e.g., a memory).

As represented by block 802, the method 800 includes recording a first video stream characterized by a first value of a first quality characteristic. In some implementations, as represented by block 804, a first image sensor of a camera system records the first video stream, such as the first image sensor 522 in FIG. 5. For example, the first image sensor corresponds to a low-resolution camera, such as a black-and-white camera or an infrared (IR) camera.

In some implementations, as represented by block 806, the method 800 includes storing the first video stream in a buffer, such as the frame buffer 430 in FIG. 4. For example, the buffer is a non-transitory memory, such a RAM, cache, etc.

As represented by block 808, the method 800 includes determining whether or not the first video stream satisfies a trigger criterion. The trigger criterion characterizes a threshold amount of video content change information. In some implementations, in response to determining that the first video stream does not satisfy the trigger criterion ("No"), the method 800 reverts back to a portion of the method 800 represented by block 802.

On the other hand, in response to determining that the first video stream satisfies the trigger criterion ("Yes"), the method 800 includes obtaining additional video information characterized by a second value of a second quality characteristic, including scene information also included in the first video stream, as represented by block 810. For example, in some implementations, as represented by block 812, obtaining additional video information includes obtaining a second video stream. In some implementations, as represented by block 814, the first video stream includes a first number of plurality of frames, the second video stream includes a second number of plurality of frames, and the first number is larger than the second number. As another example, in some implementations, as represented by block 816, obtaining additional video information includes obtaining a single video frame, such as a high-resolution video frame.

In some implementations, as represented by block 818, the first value of the first quality characteristic corresponds to a first video resolution value and the second value of the second quality characteristic corresponds to a second video resolution value that is greater than the first video resolution value. For example, a video resolution value corresponds to the number of pixels in video stream (e.g., pixel resolution).

In some implementations, as represented by block 820, a second image sensor of the camera system obtains the second video stream, such as the second image sensor 524 in FIG. 5. For example, the second image sensor includes one or more of a high-resolution camera (e.g., an RGB camera) and environmental sensor(s), such as the depth sensor 542 in FIG. 5. In some implementations, the method 800 includes deactivating the first image sensor and activating the second image sensor.

As represented by block 822, the method 800 includes generating a third video stream by adding information from the second video stream to the first video stream using a second neural network. The third video stream corresponds to a higher quality version of the first video stream. As represented by block 824, in some implementations, generating the third video stream includes retrieving the first video stream from the buffer.

FIG. 9 is an example of a flow diagram of a method 900 of generating a higher-quality image frame within a video stream by utilizing an input-triggered image frame in accordance with some implementations. In various implementations, the method 900 or portions thereof are performed by an electronic device (e.g., the electronic device 100 in FIG. 1 or the electronic device 100 in FIGS. 2A-2I). In various implementations, the method 900 or portions thereof are performed by one of the block diagram 300 in FIG. 3, the block diagram 400 in FIG. 4, or the block diagram 500 in FIG. 5. In various implementations, the method 900 or portions thereof are performed by a head-mountable device (HMD) including an integrated display. In some implementations, the method 900 is performed by processing logic, including hardware, firmware, software, or a combination thereof. In some implementations, the method 900 is performed by a processor executing code stored in a non-transitory computer-readable medium (e.g., a memory).

As represented by block 902, the method 900 includes recording, using a camera system, a first video stream characterized by a first value of a first quality characteristic. In some implementations, the camera system records the first video stream in a first mode of operation that is associated with a first power profile. For example, in some implementations, the first power profile corresponds to a relatively low power profile because the first mode of operation corresponds to a relatively low-resolution capture mode. As represented by block 904, in some implementations, a first image sensor of the camera system records the first video stream. In some implementations, the first image sensor captures a relatively low information-bearing video stream, such as a low-resolution video stream. For example, in some implementations, the first image sensor includes a combination of a black-and-white (BW) camera and an infrared (IR) camera.

As represented by block 906, in some implementations, the method 900 includes storing the first video stream in a buffer, such as the frame buffer 430 in FIG. 4. For example, the buffer is a non-transitory memory, such a RAM, cache, etc.

As represented by block 908, in some implementations, the method 900 includes detecting, via one or more input devices, a capture input. For example, in some implementations, the one or more input devices includes a push button, such as a hardware button on the side of a mobile phone or a button on the side of a head-mountable device (HMD). As another example, in some implementations, the one or more input devices includes an audio sensor, and the capture input is an audio input, such as the vocalized request of "Capture this video." As yet another example, the one or more input devices includes a touch-sensitive sensor associated with a touch-sensitive surface of an electronic device (e.g., mobile device), and the capture input is directed to the touch-sensitive surface. For example, the capture input is directed to an affordance that is displayed on the touch-sensitive surface, such as a tap input directed to a image capture request interface.

As represented by block 910, in response to detecting the capture input, the method 900 includes obtaining a first image frame characterized by a second value of a second quality characteristic. The second value of the second quality characteristic is indicative of a higher quality than the first value of the first quality characteristic. The first image frame includes scene information also included in the first video stream. In some implementations, the first value of the first quality characteristic corresponds to a first resolution value and the second value of the second quality characteristic corresponds to a second resolution value that is greater than the first resolution value. In some implementations, the camera system captures the first image frame in a second mode of operation that is associated with a second power profile that is higher than the first power profile. For example, in some implementations, the second power profile corresponds to a relatively high-power profile because the second mode of operation corresponds to a relatively high-resolution capture mode.

As represented by block 912, in some implementations, a second image sensor of the camera system captures the first image frame. In some implementations, the method 900 includes, in response to detecting the capture input, capturing the first image frame via the second image sensor. For example, in some implementations, in response to detecting the capture input, the electronic device activates the second imager sensor (e.g., instructs to begin capturing) and deactivates the first image sensor (e.g., instructs to cease recording and optionally to power down). In some implementations, the second image sensor captures a relatively high information-bearing image frame, such as a high-resolution image frame. For example, in some implementations, the second image sensor includes a red-green-blue (RGB) camera.

As represented by block 914, in response to detecting the capture input, the method 900 includes generating a second image frame by adding information from the first image frame to the first video stream. The second image frame corresponds to a higher quality version of the first video stream. In some implementations, as represented by block 916, generating the second image frame by adding the information from the first image frame to the first video stream includes retrieving the first video stream from the buffer. In some implementations, the electronic device includes a depth sensor that detects depth information, and generating the second image frame includes adding the depth information to the first video stream. In some implementations, generating the second image frame includes adding color information (e.g., hue, brightness, tint, shade, etc.) from the first image frame to the first video stream. In some implementations, adding the information from the first image frame to the first video stream is performed by a neural network. In some implementations, the method 900 includes generating a second video stream, including the second image frame, by adding information from the first image frame to the first video stream.

In some implementations, as represented by block 918, adding the information from the first image frame to the first video stream satisfies a temporal proximity threshold. For example, in some implementations, the method 900 includes detecting the capture input at a first point in time, and the information from the first image frame is added to a portion of the first video stream that is associated with a second point in time. The first point in time and the second point in time collectively satisfy a temporal proximity threshold. For example, in some implementations, the first point in time and the second point in time are the same point in time. As another example, in some implementations, the information from the first image is added to a particular video frame of the first video stream that is closest in time to detection of the capture input. As yet another example, in some implementations, the first point in time and the second point in time are within a threshold amount of time of each other. For example, an electronic device detects a capture input at time $t_0$, and at the time $t_0$ the electronic device records a first portion of the first video stream. Continuing with this example, in response to detecting the capture input, the electronic device obtains a first image frame and adds information from the first image frame to a second portion of the first video stream that is being recorded at time $t_1$. The time $t_0$ and the time $t_1$ collectively satisfy the temporal proximity threshold (e.g., are sufficiently close in time) so that the generated, high-quality second image frame includes content that matches (within a performance threshold) content included in the first video stream at the time the capture input is detected.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:

at an electronic device with one or more processors, a non-transitory memory, one or more input devices, and a camera system:

recording, using the camera system, a first video stream characterized by a first value of a first quality characteristic; and in response to detecting, via the one or more input devices, a capture input:

obtaining a first image frame characterized by a second value of a second quality characteristic, wherein the second value of the second quality characteristic is indicative of a higher quality than the first value of the first quality characteristic, and wherein the first image frame includes scene information also included in the first video stream;

storing the first video stream in a buffer; and generating a second image frame by adding information from the first image frame to the first video stream, wherein the second image frame corresponds to a higher quality version of the first video stream, and wherein generating the second image frame by adding the information from the first image frame to the first video stream includes retrieving the first video stream from the buffer.

2. The method of claim 1, further comprising detecting the capture input at a first point in time, wherein the information from the first image frame is added to a portion of the first video stream that is associated with a second point in time, and wherein the first point in time and the second point in time collectively satisfy a temporal proximity threshold.

3. The method of claim 1, wherein the electronic device includes a touch-sensitive surface, the method further comprising detecting the capture input on the touch-sensitive surface.

4. The method of claim 1, wherein the electronic device corresponds to a head-mountable device (HMD), and wherein the capture input is directed to the HMD.

5. The method of claim 1, wherein the camera system records the first video stream in a first mode of operation, and wherein obtaining the first image frame includes capturing the first image frame in a second mode of operation that is different from the first mode of operation.

6. The method of claim 5, wherein the first mode of operation is associated with a first power profile, and wherein the second mode of operation is associated with a second power profile that is larger than the first power profile.

7. The method of claim 5, wherein the camera system includes a first image sensor configured to operate in the first and second modes of operation.

8. The method of claim 1, wherein the camera system includes a first image sensor that records the first video stream, the method further comprising, in response to detecting the capture input, capturing the first image frame via a second image sensor included in the camera system, wherein the second image sensor is different from the first image sensor.

9. The method of claim 8, wherein the first image sensor includes a combination of a black-and-white (BW) camera and an infrared (IR) camera.

10. The method of claim 8, wherein the second image sensor includes a red-green-blue (RGB) camera.

11. The method of claim 1, wherein the electronic device includes a depth sensor that detects depth information, and wherein generating the second image frame includes adding the depth information to the first video stream.

12. The method of claim 1, wherein adding the information from the first image frame to the first video stream is performed by a neural network.

13. The method of claim 1, wherein the first value of the first quality characteristic corresponds to a first resolution value, and wherein the second value of the second quality characteristic corresponds to a second resolution value that is greater than the first resolution value.

14. An electronic device comprising:

one or more processors;

a non-transitory memory;

a camera system;

one or more input devices; and one or more programs, wherein the one or more programs are stored in the non-transitory memory and are configured to be executed by the one or more processors, the one or more programs including instructions for performing or causing performance of a method comprising:

recording, using the camera system, a first video stream characterized by a first value of a first quality characteristic; and in response to detecting, via the one or more input devices, a capture input:

obtaining a first image frame characterized by a second value of a second quality characteristic, wherein the second value of the second quality characteristic is indicative of a higher quality than the first value of the first quality characteristic, and wherein the first image frame includes scene information also included in the first video stream;
storing the first video stream in a buffer; and
generating a second image frame by adding information from the first image frame to the first video stream, wherein the second image frame corresponds to a higher quality version of the first video stream, and wherein generating the second image frame by adding the information from the first image frame to the first video stream includes retrieving the first video stream from the buffer.

15. The electronic device of claim 14, wherein the one or more programs include instructions for performing or causing performance of detecting the capture input at a first point in time, wherein the information from the first image frame is added to a portion of the first video stream that is associated with a second point in time, and wherein the first point in time and the second point in time collectively satisfy a temporal proximity threshold.

16. The electronic device of claim 14, wherein the camera system records the first video stream in a first mode of operation that is associated with a first power profile, and wherein obtaining the first image frame includes capturing the first image frame in a second mode of operation that is different from the first mode of operation and that is associated with a second power profile that is larger than the first power profile.

17. The electronic device of claim 14, wherein the first value of the first quality characteristic corresponds to a first resolution value, and wherein the second value of the second quality characteristic corresponds to a second resolution value that is greater than the first resolution value.

18. The electronic device of claim 14, wherein the electronic device corresponds to a head-mountable device (HMD), and wherein the capture input is directed to the HMD.

19. A non-transitory computer readable storage medium storing one or more programs, the one or more programs comprising instructions that, when executed by an electronic device comprising a camera system and one or more input devices, cause the electronic device to perform or cause performance of a method comprising:
recording, using the camera system, a first video stream characterized by a first value of a first quality characteristic; and
in response to detecting, via the one or more input devices, a capture input:
obtaining a first image frame characterized by a second value of a second quality characteristic, wherein the second value of the second quality characteristic is indicative of a higher quality than the first value of the first quality characteristic, and wherein the first image frame includes scene information also included in the first video stream;
storing the first video stream in a buffer; and
generating a second image frame by adding information from the first image frame to the first video stream, wherein the second image frame corresponds to a higher quality version of the first video stream, and wherein generating the second image frame by adding the information from the first image frame to the first video stream includes retrieving the first video stream from the buffer.

20. The non-transitory computer readable storage medium of claim 19, wherein the one or more programs include instructions for performing or causing performance of detecting the capture input at a first point in time, wherein the information from the first image frame is added to a portion of the first video stream that is associated with a second point in time, and wherein the first point in time and the second point in time collectively satisfy a temporal proximity threshold.

\* \* \* \* \*